United States Patent [19]

Fleishaker et al.

[11] 4,098,179
[45] Jul. 4, 1978

[54] MACHINE FOR PRODUCING FRIED DOUGH-ENCLOSED SAUSAGES

[76] Inventors: Michail Fleishaker, 3091 Brighton 5th St.; Michael Lidogoster, 3049 Brighton 12th St., both of Brooklyn, N.Y. 11235

[21] Appl. No.: 697,763

[22] Filed: Jun. 21, 1976

[51] Int. Cl.[2] .............................................. A47J 37/12
[52] U.S. Cl. .................................... 99/450.6; 99/353; 99/354; 99/381; 99/407
[58] Field of Search ......................... 99/404, 352–353, 99/354–355, 356, 381–382, 383–384, 450.6, 450.7, 407; 83/623; 198/670; 222/394; 302/50; 425/131.1, 288, 311, 381; 250/460, 560, 206

[56] References Cited

U.S. PATENT DOCUMENTS

| 1,349,915 | 8/1920 | Quast ....................................... 83/623 |
| 2,246,758 | 6/1941 | Roth ....................................... 425/288 |
| 2,506,412 | 5/1950 | Chausse ................................. 222/394 |
| 2,575,921 | 11/1951 | Krantz .............................. 99/450.6 X |
| 2,841,101 | 7/1958 | Hale et al. ......................... 302/50 X |
| 2,956,371 | 10/1960 | Torok ..................................... 83/623 |
| 3,211,036 | 10/1965 | Bennett .......................... 250/560 X |
| 3,274,390 | 9/1966 | Umbel .............................. 250/560 X |
| 3,314,381 | 4/1967 | Fries et al. ...................... 425/131.1 |
| 3,520,248 | 7/1970 | MacKendrick .................... 99/404 X |
| 3,615,147 | 10/1971 | Hayashi ......................... 99/450.7 X |
| 3,768,360 | 10/1973 | Heyne ................................... 83/623 |
| 3,795,183 | 3/1974 | Roth et al. ............................ 99/353 |

FOREIGN PATENT DOCUMENTS

| 115,433 | 10/1969 | Norway ............................. 99/450.6 |
| 776,630 | 6/1967 | United Kingdom ................ 99/450.6 |

*Primary Examiner*—Harvey C. Hornsby
*Assistant Examiner*—Arthur O. Henderson
*Attorney, Agent, or Firm*—Michael J. Striker

[57] ABSTRACT

A machine comprising means for continuous extruding a strand of sausages surrounded by a covering of a pre-made dough, cutting the strand into portions of predetermined length, supporting cut off portions and transferring the same for frying, frying the cut off portions in oil and removing the fried portions in timed sequence with cutting towards a container for the finished product, and a food product comprising fried dough-enclosed sausages produced by the machine.

20 Claims, 7 Drawing Figures

MACHINE FOR PRODUCING FRIED DOUGH-ENCLOSED SAUSAGES

BACKGROUND OF THE INVENTION

The present invention relates to machines for producing food products, particularly of the type having an outer enclosure and a filler.

Food products having a central filling and an outer food covering have long been known and machine for producing such foods have long been available. In producing the known foods a meat filler is extruded through an inner passage and an outer food material such as corn meal is simultaneously extruded through a surrounding passage. The resultant continuous strain of a product is then cut into portions of desired length and, the individual cut portions are wrapped for merchandizing and to keep the meat and juice therein from escaping at the cut ends, especially as they are cooked.

To our knowledge there has not heretofore been available a food product having a substantially solid shaped filler which surface is surrounded by an extruded outer material and particularly there has not been such a product as fried dough-enclosed sausages, and a machine for producing such a product.

SUMMARY OF THE INVENTION

The principal object of the present invention is to provide a machine capable of continuously producing food products having a substantially solid shaped filler particularly a sausage and an extruded outer covering of a dough.

Another object of the invention is to provide a machine which will automatically and completely provide a continuous feeding of sausages and dough, to bond these materials together, resulting in producing a continuous strand, to cut this strand into portions of predetermined length, to transfer these cut off portions into a frying pan, to fry these portions in oil, to remove these fried portions out of the frying pan in timed sequence with cutting the strand.

Still another object of the invention is to provide a food product comprising fried dough-covered sausages produced by the machine.

With these objects in view, the machine of the present invention comprises an extruder with a central passage and an annular surrounding passage, wherein the central passage is defined by a tube rotatable relative the anullar passage, and means for rotating this tube. Means are provided for feeding sausages in abutting end to end relationship into the central passage, such as an inclined box shaped container having an outlet communicating with the central passage and for feeding dough, such as a tank communicating with the annular passage and an air compressor to feed dough under pressure from the tank into the annular passage. Means are provided for cutting the strand emanating from the extruder into portions of predetermined length, which include cutting blades operatable in dependence on a signal from a photoelectric cell producing this signal when the leading end of the strand passes this cell. The cut off portions emanating from the cutting means are supported and then transferred into a frying pan by means, such as a plate having a rest position and a turned position and means for moving this plate between these positions. The machine includes further means for removing the fried portions out of the pan, which comprise an intermittently rotating member provided with paddles for moving the fried portions over an inclined plate out of the frying pan and then to a container for the finished product.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
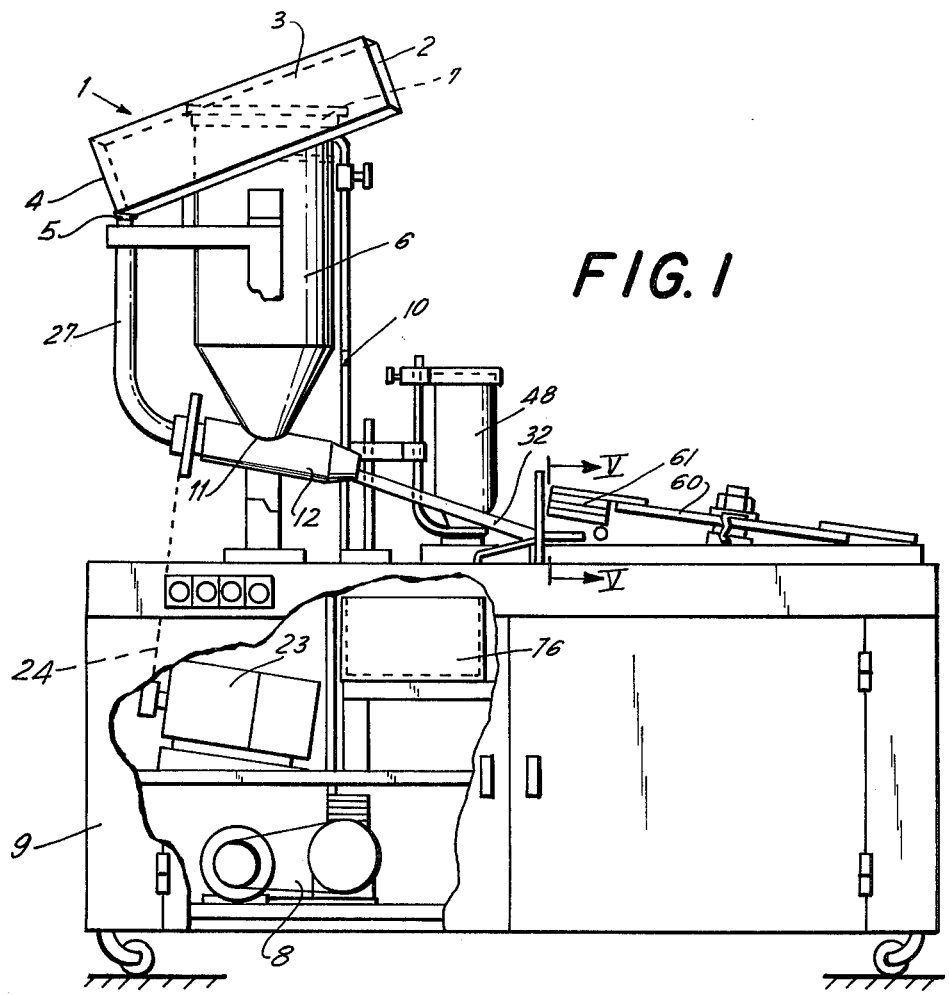
FIG. 1 is a side elevation view of the machine of the invention.

The machine according to the invention, shown in FIG. 1 has means for feeding sausages in abutting end to end relationship, comprising a box shaped container 1. The internal height of the container 1 slightly exceeds the length of the sausages, the internal width of the container 1 slightly exceeds the diameter of the sausages and the internal length of the container 1 is a multiple of the diameter of the sausages. The rear end of container 1 is open and forms an inlet 2 for feeding sausages into the container. A bottom wall 3 of a container 1 is inclined to a horizontal plane at an acute angle, at least one side wall of the container 1 normal to said bottom wall 3, such as side wall 4, is inclined to a vertical plane at an acute angle, and an outlet 5 of the container 1 is located at the lowest corner thereof. Such inclination of the container provides for gradual sliding of the sausages along the bottom wall 3, from the inlet 2 to the outlet 5 of container. Natural vibration of the machine parts intensifies such sliding of the sausages.

Means are provided for feeding the dough, which comprise a tank 6 with air tightly closed cover 7. An air compressor 8 located in a housing 9 of the machine communicates with the tank 6 through a pipe 10 above the dough therein. When compressed air from the compressor is applied to the dough the latter is fed through an outlet 11 of the tank 6.

Figure 3:
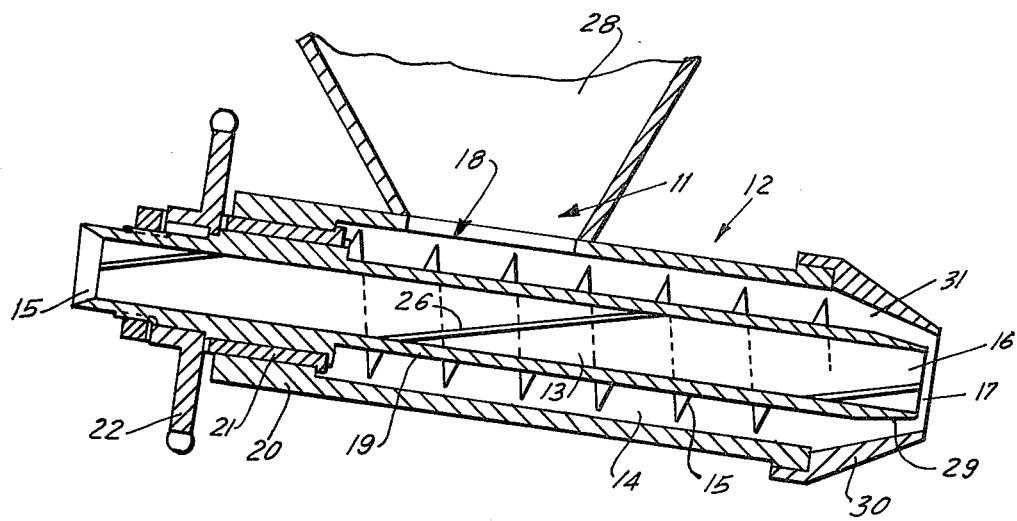
FIG. 3 is an enlarged sectional view taken on line III—III of FIG. 2 and showing the extruder of the invention.

FIG. 3 shows an extruder 12 including a central passage 13. The central passage 13 has a coaxial inlet 15 and an outlet 16 on the opposite end of this passage, and the annular passage 14 has an outlet 17 coaxial to outlet 16 of the central passage and an inlet 18 with an axis substantially normal to the axis of the central passage 13. The central passage 13 and the annular passage 14 are defined by tubes 19 and 20, respectively. The central tube 19 is rotatable relative to the tube 20. An end portion of the central tube 19 passes with a clearance through a bushing 21 pressed into an end portion of tube 20. Means are provided for rotating the central tube 19 and comprising gear means, such as a sprocket 22 driven by an electric motor 23 with a reductor, and transmission means, such as a chain 24. The central tube 19 of the extruder has a spiral screw 25 fixed to its outer surface and is provided with a spiral groove 26 on its inner surface to feed the dough through the annular passage 14 and sausages through the central passage 13, respectively, during rotating of the inner tube 19. Extruder 12 is inclined downwardly from the inlets 15 and 18 to the outlets 16 and 17 of the passages at an acute angle to a horizontal plane, whereby feeding of both products through the passages of the extruder is facilitated. The inlet 15 of the central passage 13 communicates with the outlet of the container 1 through a pipe 27 for feeding sausage from the container into the extruder 12. The inlet 18 of the annular passage 14 communicates with the tank 6 through an opening 11 in a conical bottom portion 28 of the tank 6 for feeding dough from the tank 6 into the extruder 12. The outer tube 20 has an end portion 30 removably attachable to the remainder thereof. End portion 30 of the outer tube 20 extends beyond end portion 29 of the inner tube 19. The internal surface of end portion 30 is defined by a cone converging towards the end portion 29 and forms an outlet part 31 of the annular passage 14. This results in that the extruded dough meets with the extruded sausages at an acute angle increasing bonding of the dough to the sausages. The outer surface of end portion 29 of the inner tube 19 can be also defined by a cone converging towards the outlet 16 of this passage.

A chute 32, as shown in FIG. 1, is located immediately downstream of the outlet 17 of the annular passage 14 so that its rear end is at a level slightly below the outlet 17. The chute 32 is inclined downstream at an acute angle to a horizontal plane to improve transfer of the strand extruded from the extruder 12 to cutting means.

Figure 2:
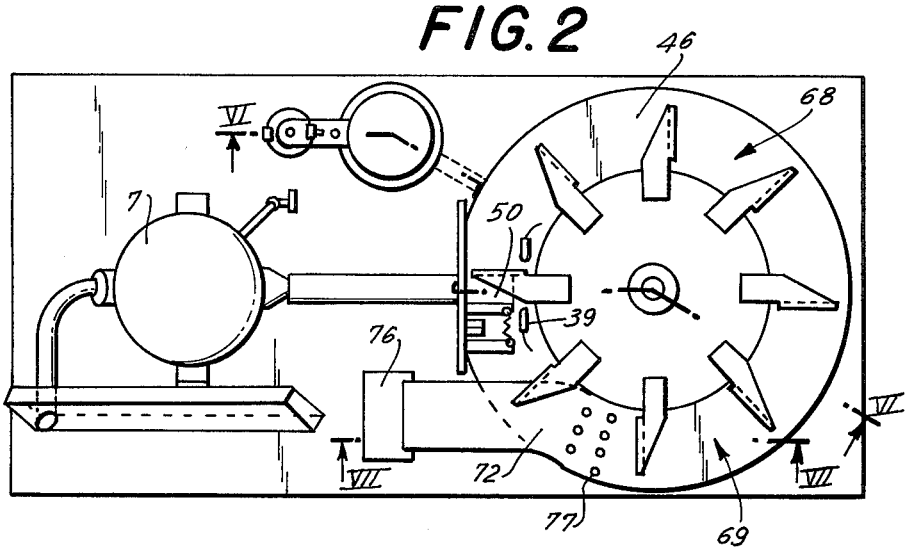
FIG. 2 is a top plan view.
Figure 4:
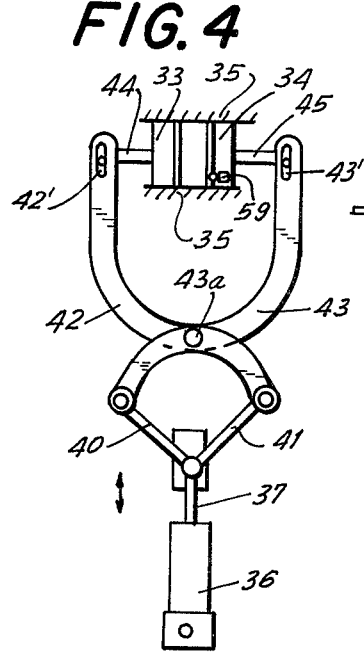
FIG. 4 is a view taken in the direction of arrow R in FIG. 6 showing means for cutting the strand of product.

The cutting means for cutting the strand emanating from the extruder 12 and transferred by chute 32 comprise, as best seen in FIG. 4, at least two blades 33 and 34 reciprocable towards each other and means for reciprocating the blades 33 and 34 in guides 35. The means for reciprocating the blades include a power cylinder 36, a piston 37 reciprocating in the cylinder 36, linkage means 38 an a photoelectric cell 39. The linkage means 38 connect the piston 37 to the blades 33 and 34 and includes two links 40 and 41 pivotably connected at one of the ends thereof to the piston 37 in a common point and at opposite ends pivotably connected to first ends of two S-shaped members 42 and 43, respectively. The S-shaped members 42,43 cross each other and are pivotably connected to each other at a cross point 43a. The second ends of the S-shaped members 42 and 43 have elongated slots 42', 43' and are pivotably connected to extension portions 44 and 45 fixedly attached to blades 33 and 34. Reciprocating of the piston 37, in a direction as indicated by the double arrow, causes scissors-type motion of the S-shaped members 42 and 43 and reciprocation of blades 33 and 34 and cutting of the strand emanating from the extruder. Photoelectric cell 39, as shown in FIG. 2, is spaced from the cutting blades 33 and 34 at a distance determined by a desired length of the cut off portions. The cell 39 is operatively connected to the power cylinder 36 so that when the leading end of the strand passes the cell 39, the latter sends a control signal to cylinder 36 causing reciprocating of piston 37, motion of linkage means, reciprocating of blades 33 and 34 and cutting off portions of the strand of a length defined by the distance between blades 33, 34 and cell 39.

Figure 6:
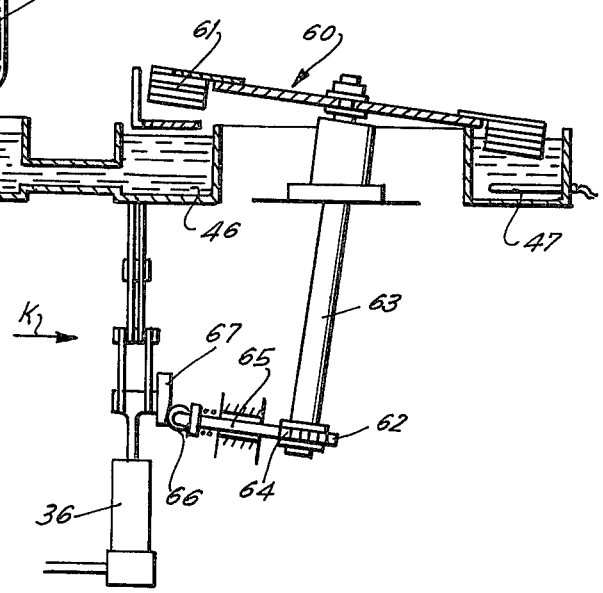
FIG. 6 is a sectional view taken on line VI—VI of FIG. 2 showing frying means of the invention and means for removing fried portions out of the frying means.

Frying means as shown in FIG. 6 comprise a frying pan such as annular container 46 open at the top and filled with oil. Heating elements 47 with thermoregulators are mounted in the container 46 for heating the oil therein. An upside down turned bottle 48 with oil communicates with its lower open end with an auxiliary container 49, which in turn communicates with container 46 whereby a constant level of oil in container 46 is maintained.

Figure 5:
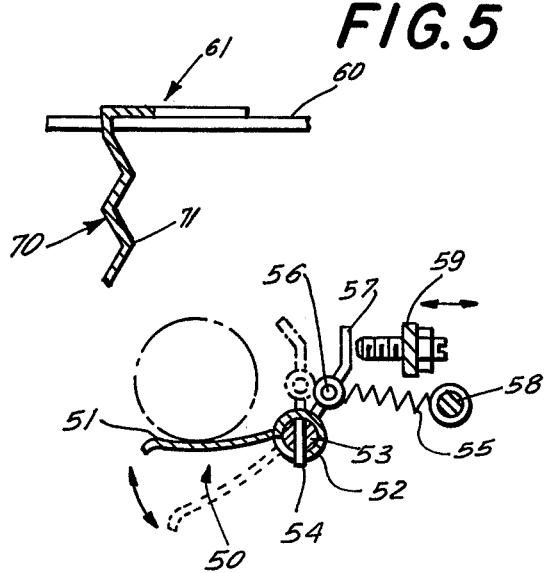
FIG. 5 is an enlarged sectional view taken on line V—V of FIG. 1 showing means for supporting cut off portions and transferring the ame to frying means, and paddles of the means for removing fried portions.

FIG. 5 shows means for supporting portions of the strand cut off by the cutting blades 33 and 34 and for transferring these portions to the frying container 46. The supporting means comprise a plate 50 located at a level slightly below cutting blades 33, 34 and having a rest position, shown by a full line and a turned position, shown by a dash line, and means for moving the plate 50 between these two positions. In the rest position the plate 50 extends in a horizontal plane and in the turned position it is inclined towards the frying container 46. The plate 50 comprises a supporting part 51 provided along one edge with a loop 52 extending about a part of a cylindrical shaft 53 with a stop pin 54 projecting with one end beyond the peripherical surface of the shaft. A tension spring 55 is connected at one end at 56 to an arm 57 fixed to and projecting from the loop 52 and at the opposite end to a fixed member 58 so as to normally hold the edge of the loop 52 against the stop pin 54 and thereby the plate 50 in a rest position. Near the end of the cutting stroke of the blades 33, 34, the pusher 59 moving with blade 34 pushes against the arm 57 and turns the plate 50 to the turned position inclined towards the frying container 46, and the cut off portion slides from supporting part 51 of the plate 50 into the frying container 46.

Means are provided for removing the fried portions out of the frying container 46 in timed sequence with operation of the cutting blades 33, 34 which comprise, as best seen in FIG. 6, a rotatable member 60 located above the frying container 46 with paddles 61 circumferentially spaced from each other downwardly projecting from the surface of ring member 60, and means for intermittently rotating the member 60, such as a ratchet 62 fixedly attached to a shaft 63 of the member 60 and a pawl 64 which cooperates with the ratchet 62. The pawl 64 is pivotally attached to one end of a rod 65 guided for reciprocation in longitudinal direction and carrying at the other end a follower 66 engaging an inclined plane of a member 67 fixedly attached to the linkage means connected to the piston 37. When the piston 37 reciprocates in the cylinder 36 the former moves member 67, which pushes the pawl 64 and forces the ratchet 62 to rotate intermittently with the shaft 63 whereby the member 60 rotates intermittently in timed sequence with the reciprocation of the blades 33, 34. The axis of rotation of the member 60 is inclined at an acute angle to a vertical plane so that paddles 61 describe a trajectory comprising as shown in FIGS. 2 and 3 a first part 68 descending towards the bottom of the frying container 46 so that the paddles 61 gradually dip into the oil, and a second part 69 ascending from the bottom of container 46 so that paddles 61 move gradually out of the oil removing fried portions out of the container 46. Each of the paddles 61 has at least a part, such as a part 70 as shown in FIG. 5, located substantially in a vertical plane and this part has corrugations 71. When the member 60 rotates and the paddles 61 move in the oil, the corrugations 71 on the vertical parts 70 force the frying portions to rotate about their axes to thereby assure uniform frying of the cut off strand portions over their outer surface.

Figure 7:
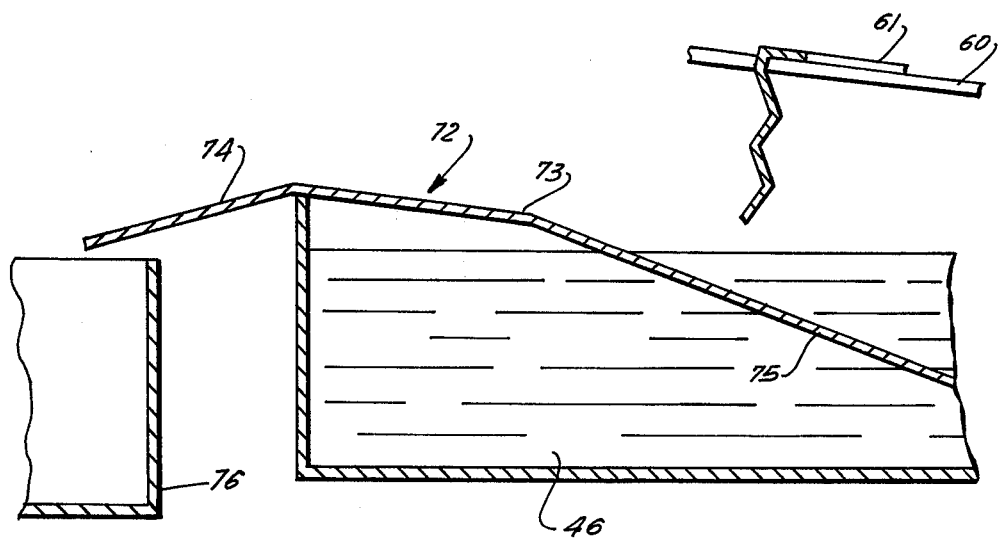
FIG. 7 is an enlarged sectional view taken on line VIII—VIII of FIG. 2, showing a bent plate of the means for removing fried portions.

Means for removing fried portions out of frying container 46 comprise also as shown in FIG. 7 a bent plate 72 which has at least two inclined parts such as parts 73 and 74 connected at their upper edges over an outer wall of container 46, and a mounting portion 75. The first part 73 of the plate 72 is located in the container 46 and inclined towards its bottom at the same angle as the ascending part 69 of the trajectory of the paddles 61. Part 73 is located slightly below this part of the trajectory. The second part 74 of the plate 72 is located out of frying container 46 and inclined towards a container 76 for accepting the finished product. When the paddles 61 move along the ascending part 69 of their trajectory in substantial closeness to the part 73 of the plate 72, slightly above it, they force the fried portions to move upwardly along a surface of the ascending part 73 of the plate 72 and then along a surface of the descending part 74 of plate 72 towards a container 76. The first part 73 of the plate 72 is located in the container 46 has perforations 77, as shown in FIG. 2. During removal of the fried portions out of the container 46, the paddles 61 take along some of the oil and these portions return through perforations 77 back to the container 46.

The machine is operated as follows:

Sausages are placed in the container 1 and dough is placed in the tank 6. The sausages move due to their own weight in container 1 downwardly towards outlet 5, pass through outlet 5 and through pipe 27 into the central passage 13 of the extruder 12. Dough under the pressure of air fed into the tank 6 by compressor 8 passes through outlet 11 and through opening 28 into the annular passage 14 of the extruder 12. The central tube 19 of the extruder 12 is rotated by the electric motor 23 through chain 24 and sprocket 22. Rotating of spiral screw 25 in the annular passage 14 and of spiral groove in the central passage 13 as well as the inclination of extruder 12 forces dough and sausages to move in the respective passages towards the outlets thereof. Dough is extruded through the conical outer part 31 of annular passage 14 and covers sausages passing through the central passage 13. The strand of sausages surrounded by dough is fed along the inclined chute 32 through the spaced cutting blades 33, 34 and further to photoelectric cell 39. When the leading end of the strand passes the cell 39, a control signal produced by the latter controls in a known manner feeding of compressed air into the cylinder 36 so that the piston begins to reciprocate and forces through the links 40, 41, the S-shaped members 42, 43 and the extension portions 44, 45 the blades 33, 34 to reciprocate and to cut off portions of the strand of a predetermined length. Before being fully cut off the portions rest on supporting part 51 of the plate 50. At the end of the cutting operation, pusher 59 fixedly attached to blade 34 pushes against the arm 57 of plate 50, and turns plate 50 to the turned position inclined towards frying container 46 and the cut off portion slides out from the supporting part 51 of the plate 50 into the frying container 46. The cut off portions are fried in the container 46 in oil, heated by heating elements 47 and maintained at a constant level by supplying oil from the auxiliary container 49. The member 60 rotates intermittently in timed sequence with the cutting operation by means of ratchet 62 and pawl 64 moved by member 67 fixedly attached to the piston 37. The member 60 rotates the paddles 61 which move the frying portion in the container 46, rotate these portions by the corrugations 71 and then move the fried portions upwardly along the surface of ascending part 73 of the bent plate 72 where the fried portions, due to their own weight, slide along the surface of the descending part 74 of the bent plate 72 into a container 76 for accepting of the finished product.

Without further analysis, the foregoing will so fully reveal the gist of the present invention that others can, by applying current knowledge, readily adapt it for various applicatons without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

1. A machine for producing fried dough-enclosed sausages, comprising an extruder having a central passage and an annular passage surrounding said central passage, said central passage being defined by a tube rotatable relative to said surrounding passage, each of said passages having an inlet and an outlet; means for rotating said tube; means for feeding sausages in abutting end to end relationship through said inlet of said central passage into the latter; means for feeding premade dough through said inlet of said annular passage into the latter so that a strand of sausages surrounded by dough will leave the outlet of said passage; cutting means downstream of the outlet of said annular passage for cutting the strand emanating therefrom into portions of predetermined length; frying means downstream and below said outlet of said annular passage for frying said portions; means for supporting said cut off portions emanating from said cutting means and for transferring the same to said frying means; and means for removing said fried portions out of said frying means in timed sequence with operation of said cutting means, said removing means comprising a rotatable member located above said frying pan and having circumferentially spaced, downwardly extending paddles, means for intermittently rotating said member, said member having an axis of rotation inclined at an acute angle to a vertical plane so that said paddles describe a trajectory comprising a first part descending towards the bottom of said frying pan so that said paddles are gradually dipping into the oil in the pan and a second part ascending from the bottom of said frying pan so that said paddles move gradually out of the oil.

2. A machine as defined in claim 1, wherein said means for feeding the dough comprise a tank adapted to be filled with dough, said tank having an outlet communicating with said inlet of said annular passage of said extruder, closure means for air tightly closing said tank, and means for applying pressure on said dough in said tank so that the dough is fed through said outlet of said tank into said inlet of said annular passage.

3. A machine as defined in claim 2, wherein said means for applying pressure on said dough comprise an air compressor communicating with said tank above said dough.

4. A machine as defined in claim 1, wherein said means for feeding sausages comprise a box shaped container which has an internal height slightly exceeding the length of the sausages, an internal width slightly exceeding the diameter of the sausages and an internal length being a multiple of the diameter of sausages, said container having an inlet to feed the sausages thereinto and an outlet communicated with said inlet of said central passage of the extruder for feeding the sausages from said container to said extruder.

5. A machine as defined in claim 4, wherein said container has a bottom wall inclined to a horizontal plane at an acute angle and at least one side wall normal to said bottom wall and inclined to a vertical plane at an acute angle, said outlet of said container being at a lowest corner of said container.

6. A machine as defined in claim 1, wherein said tube of said extruder has an outer surface having a spiral screw.

7. A machine as defined in claim 1, wherein said extruder is inclined downwardly in direction from said inlets to said outlets of said passages at an acute angle to a horizontal plane.

8. A machine as defined in claim 1, wherein said central passage and said annular passage of said extruder has end portions, an internal surface of said end portion of said annular passage extending beyond said end portion of said central passage and being defined by a cone shaped internal surface converging towards said end portion of said central passage.

9. A machine as defined in claim 1, wherein said means for rotating said tube of said extruder comprise gear means driven by an electric motor and transmission means between said gear means and said tube.

10. A machine as defined in claim 1, wherein said cutting means for cutting the strand comprise at least two blades reciprocable in one plane towards and into contact with each other and means for reciprocating the blades.

11. A machine as defined in claim 10, wherein said reciprocating means comprise a power cylinder, a piston reciprocating in said cylinder, linkage means connecting said piston to said blades, and a photoelectric cell; said cell being spaced from said cutting blades at a predetermined distance and operatively connected to said power cylinder for causing the reciprocation of the piston thereof whenever the leading end of the strand passes said photoelectric cell.

12. A machine as defined in claim 1, wherein said means for supporting said cut off portions emanating from said cutting means and for transferring the same to said frying means comprise a plate located at a level slightly below said cutting blades and having a rest position extending in a horizontal plane and a turned position inclined towards said frying means, and means for moving said plate between said positions.

13. A machine as defined in claim 12, wherein said means for moving said plate between said two positions comprise spring means for holding said plate in said rest position and pushing means for turning said plate to said turned position, said pushing means being fixedly connected with said cutting means.

14. A machine as defined in claim 1, wherein said means for frying comprise a frying pan filled with oil and means for heating said oil.

15. A machine as defined in claim 14, wherein said frying pan is an annular container open at a top thereof.

16. A machine as defined in claim 1, wherein said rotatable member has a shaft extending along said axis of rotation, said means for intermittently rotating said member comprising a ratchet fixedly attached to said shaft and a pawl cooperating with said ratchet; and means for reciprocating said pawl and comprising a rod cooperating with said linkage means of said cutting means.

17. A machine as defined in claim 1, wherein each of said paddles has at least a part located substantially in a vertical plane and provided with corrugations.

18. A machine as defined in claim 1, wherein said means for removing said fried portions out of said frying means further comprise a bent plate having at least two inclined parts connected at upper edges thereof above the outer wall of said frying pan, a first one of said parts being located in said frying pan inclined towards the bottom thereof at the same angle as said ascending part of the trajectory and located so that said paddles during movement along said ascending part of their trajectory pass above said first part of said plate in a substantial closeness thereto to force and fried portions to move along said first part of said plate, a second part of said plate being located out of said frying pan and being inclined towards a container for accepting the finished product.

19. A machine as defined in claim 18, wherein said first part of said bent plate has perforations for returning any oil, lifted out of said frying pan by said paddles, back to said frying pan.

20. A machine as defined in claim 1, wherein said tube has a spiral groove provided on an inner surface thereof.

* * * * *